United States Patent [19]
Pfeiffer et al.

[11] 3,887,717
[45] June 3, 1975

[54] PROCESS FOR THE EXTRACTION OF PROTEINS, OTHER NITROGENOUS SUBSTANCES AND LIPIDS FROM BONES

[75] Inventors: Gottfried Pfeiffer, Eching; Robert Wellhauser, Dachau; Hartmut Gehra, Furstenfeldbruck, all of Germany

[73] Assignee: Herta KG Karl Schweisfurth, Germany

[22] Filed: Nov. 21, 1972

[21] Appl. No.: 308,439

[30] Foreign Application Priority Data
Nov. 22, 1971 Germany............................ 2157850

[52] U.S. Cl............. 426/264; 260/112 R; 260/412; 426/321; 426/271; 426/328; 426/332; 426/364; 426/431; 426/437
[51] Int. Cl. ................................................ A23j 1/10
[58] Field of Search ........... 426/321, 328, 364, 431, 426/437, 371, 480, 149, 178, 212, 227, 229, 264, 330, 332, 369, 370, 382, 479, 506, 518, 524, 271; 260/112 R

[56] References Cited
UNITED STATES PATENTS
3,028,243  4/1962  Robertson et al. ................. 426/480
3,112,203  11/1963  Watt .............................. 426/480 X

*Primary Examiner*—James R. Hoffman
*Attorney, Agent, or Firm*—Armstrong, Nikaido & Wegner

[57] ABSTRACT

An improved process for the extraction of proteins, other nitrogenous substances and lipids from bones, including bones with adherent meat is described. The particular features of the invention are that the bones are very finely comminuted and mixed with at least 60 percent by weight of water and/or ice such that the proteins and like substances are dissolved and dispersed in the water.

11 Claims, No Drawings

PROCESS FOR THE EXTRACTION OF PROTEINS, OTHER NITROGENOUS SUBSTANCES AND LIPIDS FROM BONES

The bones obtained on manual dissection contain, as high quality consituents for human and animal nutrition, not only adhering fatty tissue and remnants of meat but also a substantial content of high quality nitrogenous substances and lipids which originate from the bone content. According to the present-day dissection practice, even if the meat is thoroughly removed manually from the bones, there still remains, for example on vertebra bones of cattle and pigs, up to 6 percent or more of meat, containing approx. 17 percent to 19 percent of crude protein, of which approx. 30 percent is connective tissue, and containing about 15 percent to 25 percent of fat. As a rule, this part of the meat, together with the fat and the remaining protein and nitrogenous substances in bones, is lost as far as the manufacture of meat products, and hence human nutrition, is concerned.

In view of the increasing shortage of animal protein, this loss of nutritionally biologically and technologically valuable protein is a serious disadvantage.

The invention aims very largely to avoid this loss of valuable nutrient substances and to achieve as high a yield as possible in the hygienic isolation and technological separation of the bones and the adhering muscle meat for the manufacture of meat goods.

Hitherto, the procedure followed in dissecting animal carcasses has as a rule been that after draining the blood and removing the entrails the carcasses are halved or quartered and are then further dissected in accordance with various cuts. The dissection is aimed at obtaining the meat adhering to the skeleton rapidly and as completely as possible. In the case of the parts of the meat in the region of long bones this can be achieved manually without difficulty. However, difficulties exist where, because of projections on the bones, thorough detachment of the meat is manually only achievable with costly expenditure of time and with considerably hygienic hazards to the meat. Admittedly, instruments have been in use for about a decade by means of which, using a rotating circular knife blade of about 5 cm. diameter, the meat located between bone projections can also be detached manually somewhat more rapidly and with less expenditure of force. the hygienic problem which results from the increase in surface area and also from the possibility of an additional contamination by the process operatives is however not eliminated thereby, and the labor to be expended is also not signficantly reduced.

Further, an instrument has been marketed in which the separation of the meat constituent from the bones is achieved by comminuting the bones to which meat is attached and pressing them, in this form, against the outer wall of a rotating drum provided with slits. The softer parts of the tissue are thereupon pressed into the interior of the drum and removed from there. This machine, which can in a modified form also be employed, for example, for removing bones from fish flesh, results in a considerable reduction of cost arising from personnel, an makes it possible, for example, also to separate the meat from the tail bones of pigs, the manual treatment of which is uneconomical. Whilst from the point of view of hygiene this machine offers the advantage that contamination of the meat by the process operatives is eliminated, the increase in the surface area of the meat results in an intensive distribution of germs, so that, similarly to the case of mince meat, an hygienically extremely labile raw material is obtained.

DAS No. 1,280,700 describes a process for separating the meat from raw bones. The bones carrying the meat are comminuted by rotating blades to the point that they can pass through orifices of about 6 mm. diameter. The bone particles are then transported, by means of a screw conveyor, into a mixing vessel where they are mixed with 10 percent to 30 percent, preferably with 15 percent to 20 percent, of water relative to the dry weight of the fat-free meatbone mass, and are subsesequently separated, by centrifuging, into the constituents, namely bones, water and meat. The comminution proposed is regarded as optimal because the average particle size should be between 1.6 and 4.8 mm. predominantly about 3.2 mm. and exceptionally about 0.4mm. The meat adhering to the bones is largely freed of the bone constituents by this comminution process. As a result of the interposition of the screw conveyor, the separation is supposed to be continued yet further through the shear forces which act in the conveyor. At the point that they enter the centrifuge, the bones are substantially free of meat which is substantially non-coagulated.

An installation based on this process was offered in 1968 by Messrs. Sharples, USA, in which installation, the meat bones, with the addition of 40 percent of ice and/or water, are again only comminuted to the point that on the one hand maximum separation of the meat from the bones results whilst on the other hand only a minimum of fine bone particles is produced. The bone material comminuted to this point is introduced into a vessel equipped with a stirrer, the vessel being so designed that continuous charging of the centrifuge with a bone slurry of approximately constant composition is ensured. The bone slurry is pumped from this vessel directly into the centrifuge in which the bone particles are separated from the remaining mixture.

The product separated-off in the centrifuge consists, in the case of the spearation of 100 kg. of pig bones with 20 percent of adhering meat and an added 40 kg. of ice and/or water, of 60 to 65 kg. of meat slurry of a creamy consistency, which contains about 50 percent of water, a protein content corresponding to 20–25 percent of lean meat, and 20–25 percent of fat. The yield is increased by a certain amount if the bone again resulting from centrifuging is once agains subjected to the treatment mentioned.

This process is conceived for obtaining solely the meat adhering to the bones and, according to the statement of Messrs. Sharples, presupposes bones containing a minimum of 10 percent of adhering meat.

The invention is based on the task of substantially increasing the yield of nutritionally physiologically and/or technologically high quality proteins and nitrogenous substances as well as lipids, as compared to the known processes. The increase in the yield also offers an advantage inasmuch as it is no longer necessary to free the bones of meat as far as possible during dissection.

In the isolation of nutritionally physiologically and/or technologically high quality proteins and nitrogenous substances as well as of lipids from bones and from bones with meat of warm-blooded and cold-blooded animals by comminution whilst cooling, supplying water and/or ice, and centrifuging the resulting suspension to give a solid and a liquid phase, the task is principally achieved, according to the invention, by comminuting the starting material, consisting of bones with varying amounts of adhering meat or without meat, so finely that the proteins and nitrogenous substances other than from connective tissue are present is a dissolved and dispersed form and mixing the material, during or after the comminution, with more than 60 percent of water and/or of ice.

A further aim of the invention consists of ensuring that the treatment process is carried out hygienically so that products which keep better are obtained. The invention also aims at products with improved technological properties.

In a preferred embodiment of the invention the starting material, after preliminary comminution, is mixed with water or ice and up to 5 percent by weight of NaCl, relative to the weight of the mixture. This mixture is converted, by very fine comminution, into a system in which the proteins and nitrogenous substances other than from connective tissue are present in a dissolved and dispersed form.

The process according to the invention is explained in more detail below in relation to examples.

A starting material consisting of bones with adhering meat remnants is comminuted, with the addition of 20 percent of ice or cold water to prevent an unfavorable temperature rise, to the point that a highly viscous paste having a temperature of below 15°C and with bone particles which pass through perforated plates with 3 mm. holes results. This paste is introduced into a vessel in which 100 parts of paste are suspended with 80 parts of a sodium chloride brine. The sodium chloride concentration, relative to the resulting mixture, should, for hygienic and technological reasons, be at least 2 percent, whilst for technological reasons it should not be more than 5 percent. The temperature should not exceed 3°C. The cooling of the brine required to ensure this temperature range can be achieved through the conjoint use of ice in the manufacture of the brine.

The sodium chloride which is already present during the subsequent very fine comminution process results in a retardation of germ growth, particularly since it also intensifies the lowering of the temperature of the comminution material, which the addition of ice is intended to achieve. Storage tests at 4°C have shown that the hygienic effect of the sodium chloride does not result in any organoleptically perceptible detriment to the liquid phase, even after a storage time of 48 to 60 hours. In production operation, a freezing of the liquid phase resulting from the centrifuge would however be necessary if, because of a longer storage time than 48 hours, an increase in the number of halo-tolerant, psychrophilic and psychro-tolerant germs is to be expected.

The raw materials remaining in the solid phase also gain in importance as a result of the improved hygienic conditions of the process.

The very fine comminution of the bones with meat left thereon results in the protein surface area being increased many-fold, not only mechanically but simultaneosly also chemically as a result of the presence of water and sodium chloride and the resulting intensified hydration of the fibrillar muscle proteins. The ability of the protein obtained from the bone material to bind water is substantially improved thereby. The action of the sodium chloride ions can be boosted by adding salts of edible acids such as citric acid, acetic acid, tartaric acid and lactic acid and above all by means of phosphates. Phosphates and citrates are also of advantage inasmuch as they bind Ca ions which can interfere with the hydration of protein substances.

The process offers a further advantage when using nitrite pickling salt or sodium chloride with potassium nitrate or sodium nitrate instead of sodium chloride alone. The product batches obtained, for example, with nitrite pickling salt, from beef bones and pig bones with approx. 25 percent of adhering muscle meat show, after boiling, a strong red color of pickled meat which results not only from the change to red of the adhering muscle meat but also from the change to red of chromoproteids of the haematopoetic system liberated from the interior of the bones. The change to red is also associated with the advantage of a change in aroma.

Where it is intended to bind free Ca ions or control oxidation of redox processes or achieve certain flavors, the additives required in each case are best already admixed in this processing stage.

The resulting mixture is very finely comminuted by means of a very fine comminution apparatus of the type of the colloid mills or apparatuses having a similar comminuting action, and is transferred into a storage vessel and there kept mixed by means of a stirrer. The very finely comminuted mixture is them pumped by means of a metering pump into a decanter in order to separate off the solid constituent consisting predominantly of bone particles and connective tissue. The resulting liquid phase contains dissolved and dispersed proteins and nitrogenous substances as well as suspended and/or emulsified lipids which can predominantly be separated off by centrifuging even without application of heat.

The liquid and the solid phase are collected in vessels which can be cooled and from where they can, in the case of storage, either be subjected to a freezing process or some other preserving process, optimally with simultaneous removal of water. In the normal case they can be released for direct utilization, for example for the production of foodstuffs, such as soups, sauces, stocks and meat products, feedstuffs or pharmaceutical or cosmetic products (liquid phase) or of gelatine, feedstuffs and fertilizers or technical products such as, for example, glue (solid phase).

In addition there is the possibility of largely de-fatting the liquid phase, for example by centrifuging, prior to its processing and once again to separate the solid constituent from the solid phase after renewed suspension in a cooled brine of not more than 50 percent strength (relative to the weight of the solid removed by centrifuging) and very fine comminution in a machine of the type mentioned. The liquid phase thereby produced can be admixed to the liquid obtained in the first pass, if appropriate after prior centrifuging off of the fat. The solids constituent resulting from the second pass can be utilized for the purposes already mentioned.

The ballasting relative to the bone material, that is to say, the addition of water and/or brine in an amount of up to 140 percent including the 20 percent of ice or water already added during the preliminary comminution, is most suitable when processing bones with up to 20 percent – 30 percent of adhering meat. In the case of sheer bones with residual meat contents of up to 10 percent a ballasting of a total of 100 percent suffices.

In the case of bones with higher meat contents than 30 percent the ballasting is best chosen, as a function of the particular proportion of meat, in such a way that the crude protein content in the resulting liquid centrifuged product does not exceed 7 percent. The suspensions resulting from such a ballasting ratio, by virtue of their specific viscosity ranges, not only provide good prerequisites for separating the liquid phase from the solid constituent in the decanter but also provides favorable conditions for largely separating the fat from the liquid phase.

The bones obtained in dissection contain, in addition to remaining muscle meat which can no longer be economically completely removed manually, as well as fat and connective tissue, also considerable amounts, in the bone cavitites, of valuable protein and nitrogenous substances as well as lipids of which only a relatively small proportion is utilized for human nutrition by the hitherto known processes, despite the high nutritional-physiological and dietetic value of the substances. In most cases, these contents of bones, together with the more or less thoroughly stripped meat bones, are sold to the gelatine and feedstuff industry and only a small extent are they isolated, for example by melting off and frying off for, for example, the manufacture of soups and sauces. However, even in these cases predominantly only the liquid components are isolated, whilst the nitrogenous substances contained in the bone cavities largely remain in the bone structure. In the production of gelatine the substances left in the bone structure, where they do not produce glue, are even objectionable.

The substantially higher proportion of water of the suspension to be separated, as compared to the process according to DAS No. 1,280,700, makes it possible, in conjunction with the very fine comminution, to achieve a yield which at times is increased more than two-fold, of proteins and nitrogenous substances, without the quantity of inorganic bone constituents remaining in the liquid phase being detrimental nutritionally physiologically or technologically.

The increase in yield shown in the table which follows is not significantly influenced by the sodium chloride content. As a result of this observation, the use of sodium chloride can also be dispensed within the process without reducing the increased yield, the sodium chloride being replaced optionally by some other substance which increases the durability of the product. The table provides a comparison of the yields of protein between the process according to the invention and the process of Messrs. Sharples. The data are based in the first case (I) on exact investigations by the applicant company and in the second case (II) on tabulated data of Messrs. Sharples.

|  | Mixed pig bones with 20% – 30% of meat | | Bones from shoulder and ham with 10% – 20% of meat | |
|---|---|---|---|---|
|  | I | II | I | II |
| g of collagen-free protein obtained/ kg of bones | 50.6 | 26.4–35.8 | 39.5 | 12.1–19.7 |
| Increase in yield by % |  | 89.4–39.7 |  | 226.4–99.5 |

It is to be noted that according to the known process the solids constituents resulting from the first pass through the centrifuge has such a high residual meat content that in view of the constantly rising costs of animal protein it is not possible to dispense with isolating it as completely as possible, that is to say to dispense with an after-treatment of this solid constituent. Even in the process according to the invention, where an increased yield is already achieved in the first pass, the content of nutritionally physiologically high quality nitrogenous substances other than from connective tissue remaining in the solid constituent justifies rinsing and again centrifuging in the latter.

The process according to the invention results in the isolation of protein of increased technological value. It is known that for optimum emulsification of fat and water by muscle proteins, maximum hydration of the latter is a prerequisite. Apart from the hygienic effect, the use of NaCl in the process according to the invention fulfills the additional technological requirements of maximum hydiation of the fibrillar muscle proteins introduced with the bones.

In addition to this action of the sodium chloride, which can be boosted by further additives, such as, for example, polyphosphates, technological improvements in the centrifuged products are also achievable by means of additives for controlling the change in redness and change in aroma as welll as oxidation or redox processes, or additives for producing flavor variants.

The process according to the invention also ensures that the various products are obtained hygienically. As is known, any comminution of animal tissue implies a hygienic hazard to the comminuted product, since the increase in the surface areas is accompanied by a dispersion of original colonies of germs. Since the original germ population of chilled meat predominantly consists of psychrophilic and psychro-tolerant germs, mere chilling of comminuted meat does not prevent germ growth to the same extent as does an immediately started freezing. However, for utilization reasons there exists the need to be able to store intermediate products of comminuted animal tissues even at approx. 4°C for up to 48 hours until their processing, and the heating in most cases associated therewith, takes place, without a significant multiplication of germs occuring, in the interim.

In the process according to the invention, a considerable lowering of the temperature of the products can be achieved by a sufficient amount of ice already being added during the preliminary comminution and very fine comminution. Together with the addition of salt, and effective adaptation threshold is created for the original germ flora which is not adapted to sodium chloride. The effect of lowering the temperature, and the effect of the sodium chloride in delaying germ growth makes it possible to store the products obtained, even without freezing, at approx. 4°C for up to 48 hours without a significant multiplication in germs resulting.

The solid resulting from the process is also of greater value for the manufacture of gelatine than in the case of the known processes, since the contents of protein other than from connective tissue are substantially less, even if rinsing is not employed, and because the solid component displays a very high degree of comminution.

We claim:

1. In a process for extracting proteins, other nitrogenous substances and lipids from bones, including bones with adherent flesh, of warm and cold blooded animals, by comminuting the bones with cooling, supplying water and/or ice to the bones before, during or after communition and centrifuging the resulting aqueous mixture, the improvement in which comprises comminuting the bones so finely that the proteins and other nitrogenous substances, other than the remaining connective tissue, are dissolved and disposed in the aqueous mixture and in which the bones are mixed with a total quantity of at least 60 percent of water and/or ice based of the weight of the bones with adhering flesh.

2. A process as claimed in claim 1 wherein the bones are mixed with a total of 80 percent to 20 percent, by weight based on the weight of the bones, of water and/or ice added before, during or after the communition.

3. A process as claimed in claim 1 wherein at least one preservative material is included in the mixture.

4. A process as claimed in claim 3 wherein the preservative material comprises up to 5 percent by weight of NaCl based on the weight of the mixture.

5. A process as claimed in claim 1 wherein at least one sodium or potassium salt of nitric or nitrous acids is included in the mixture.

6. A process as claimed in claim 1 wherein at least one substance capable of increasing the hydration of the proteins and other substances to be rendered soluble and dispersible is included in the mixture.

7. Process of claim 6 wherein said substance capable of increasing hydration is selected from the group consisting of sodium chloride, edible salts of each of citric acid, acetic acid, tartaric acid, lactic acid and phosphoric acid.

8. A process as claimed in claim 1 wherein at least one antioxidant is included in the mixture.

9. A process as claimed in claim 1 wherein at least one spice or flavoring substance is included in the mixture.

10. Process of claim 1 wherein the solid phase is separated from aqueous mixture and subjected to washing and recentrifuging to extract further protein.

11. A process for the extraction of proteins, other nitrogenous substances and lipids from bones, including bones with adherent flesh, of warm and cold blooded animals which process comprises the steps of:

a. performing a preliminary comminution of the bones with the addition of about 20 percent ice water such that the temperature does not rise above 15°C, and that all bone particles in the intermediate comminuted mixture will pass through a perforated plate with 3 mm holes, b. suspending about 100 parts by weight of the intermediate comminuted mixture of step (a) in about 80 parts of a cold sodium chloride brine such that the sodium chloride concentration is the resulting suspension lies in the range of about 2 percent to about 5 percent by weight and that the temperature does not exceed 3°C, c. adding to the suspension of salt of an edible acid selected from alkali metal salts of citric, acetic, tartaric, lactic and phosphoric acids together with a pickling salt selected from sodium and potassium salts of nitric and nitrous acids, d. finely comminuting the suspension in a colloid mill such that proteins and other nitrogenous substances other than those from connective tissues are dissovled and suspended, e. centrifuging the comminuted mixture of step (d) to form separable liquid and solid phases, f. separating the protein containing liquid phase and washing and re-centrifuging the solid phase to extract further protein.

* * * * *